Figure 1:
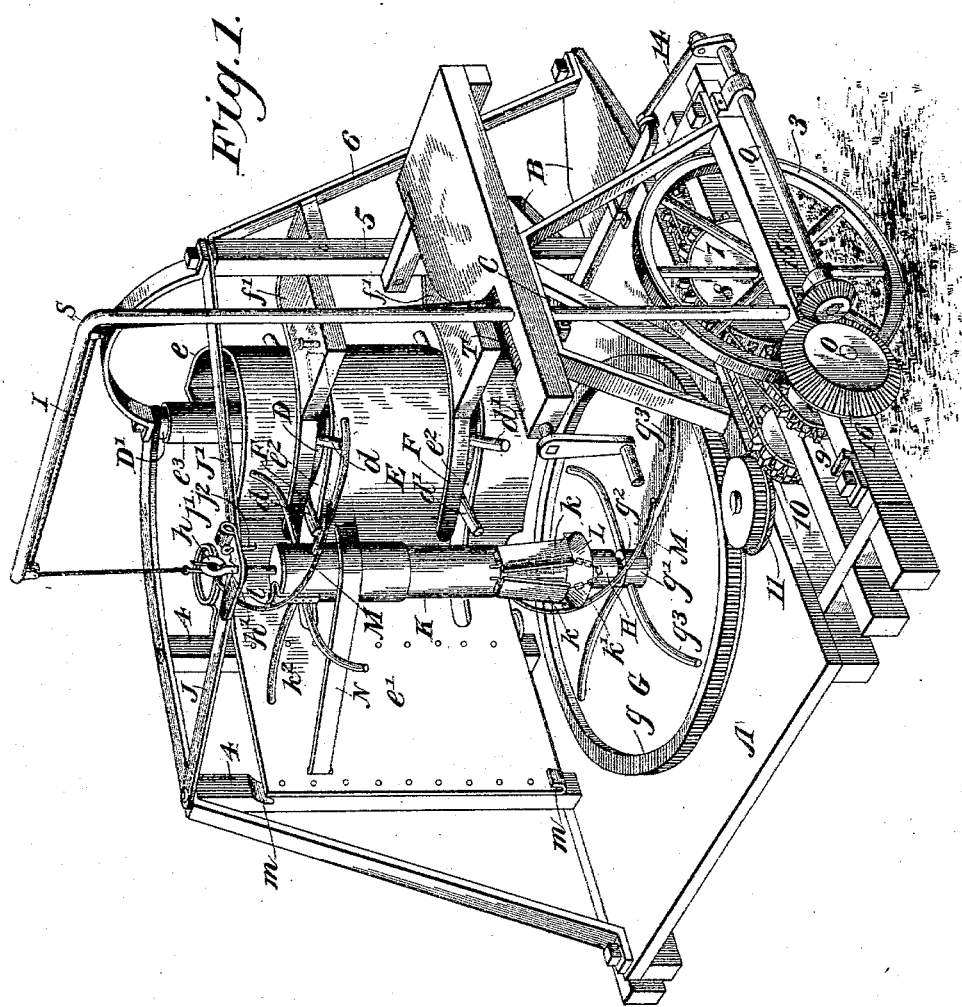

(No Model.) 2 Sheets—Sheet 1.

J. M. SHIVELY.
CORN CUTTER.

No. 559,754. Patented May 5, 1896.

Witnesses
J. M. Witherow
V. B. Hillyard

Inventor,
J. M. Shively,
By his Attorneys.
C. A. Snow & Co.

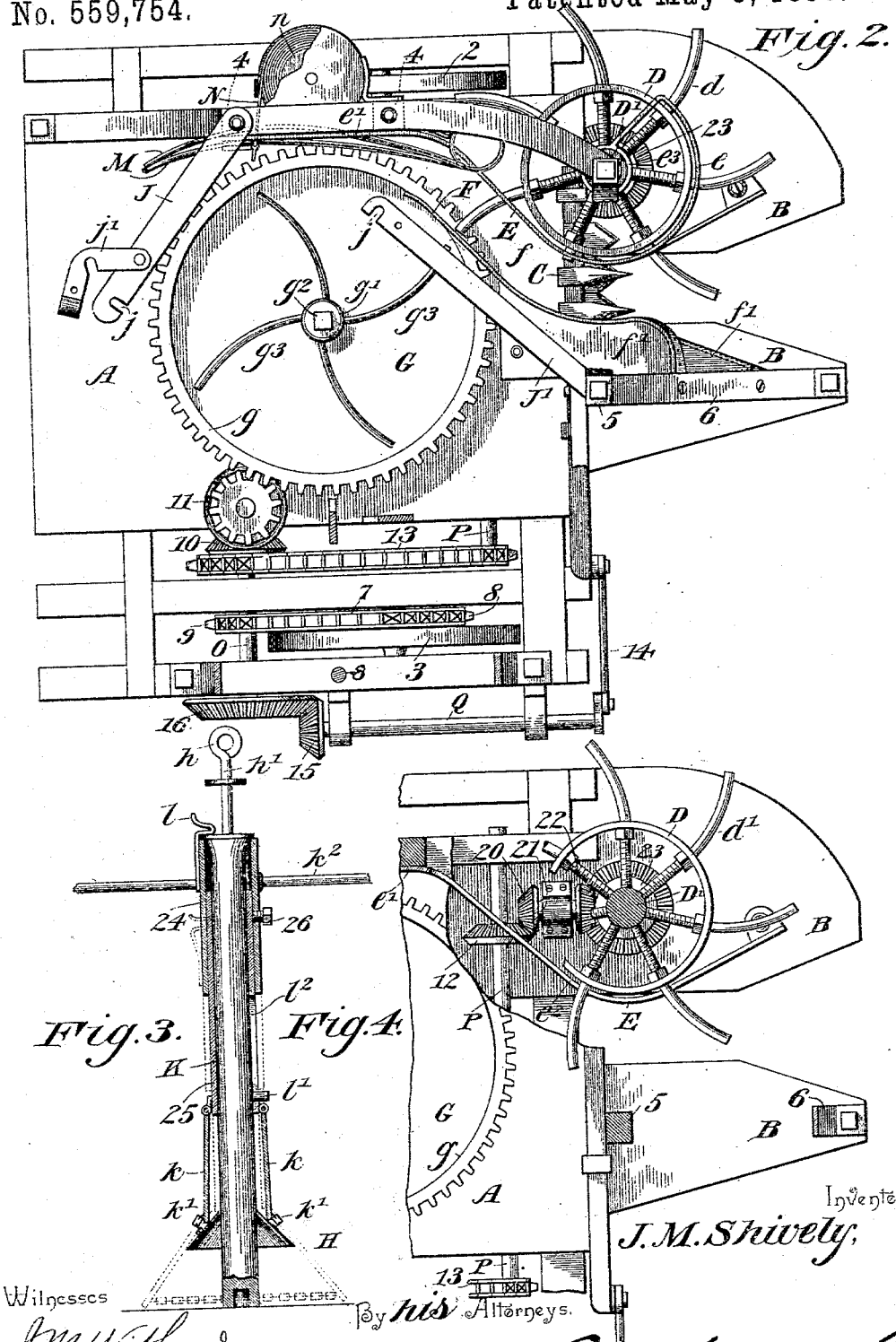

UNITED STATES PATENT OFFICE.

JOSEPH M. SHIVELY, OF ALFRED, KANSAS, ASSIGNOR OF ONE-HALF TO EDWARD SHIVELY, OF SAME PLACE.

CORN-CUTTER.

SPECIFICATION forming part of Letters Patent No. 559,754, dated May 5, 1896.

Application filed March 12, 1896. Serial No. 541,502. (No model.)

*To all whom it may concern:*

Be it known that I, JOSEPH M. SHIVELY, a citizen of the United States, residing at Alfred, in the county of Douglas and State of Kansas, have invented a new and useful Corn-Cutter, of which the following is a specification.

The purpose of the present invention is the provision of a machine for harvesting and shocking corn and similar growths which can be successfully and economically operated with a comparatively light draft, and which will carry the stalks to the cutter and upon a rotatable shocking-table in an upright position, the shock being automatically formed and gradually compressed in the process of formation.

A machine to be successfully operated and give satisfactory results in shocking corn and like stalky growths must spread the butt-end of the shock to enable the latter to obtain a firm purchase when deposited upon the ground, so as to prevent its toppling over. To meet this requirement, I have combined with the shocking mechanism a spreader to increase the base of the shock or separate the butt-ends of the stalks, this operation being automatically performed by the mass of the shock when lifting it by means of the elevating mechanism prior to swinging the crane to deposit the shock upon the ground after clearing the machine.

A further purpose of the invention is to have the spreader form a part of the core about which the shock is formed, the core being detachably connected with the shock-forming table and adapted to have the elevating mechanism attached thereto when it is required to deposit the completed shock upon the ground.

For a full understanding of the invention reference is to be had to the accompanying drawings and the following description.

Figure 1 is a perspective view of a corn harvesting and shocking machine constructed in accordance with and embodying the essence of the invention. Fig. 2 is a plan view of the machine, showing the core detached from the shock-forming table, the spring-compressors held back, the bearings for the upper end of the core turned aside out of the way, and the crane and its upper supports broken away. Fig. 3 is a vertical sectional view of the core about which the shock is formed and the spreader attached thereto. Fig. 4 is a detail in plan illustrating the mechanism for driving the reel.

The platform A is mounted upon ground-wheels 2 and 3, which latter are so disposed as to have the platform and the attached parts balanced thereupon. The ground-wheel 3 is also the drive-wheel for imparting movement to the operating parts. Guards B project forward from the front end of the platform and have their opposing edges oppositely flared to guide the stalks into the narrow passage between the inner edges of the said guards. The cutting apparatus C is located at the front end of the platform and operates across the space at the inner ends of the guards B, and may be of any desired construction best adapted for the purpose. A vertical reel D is located to one side, preferably the left, of the passage between the guards B, and has two sets of reel-arms, an upper set $d$ and a lower set $d'$, the arms of each set being in coincident vertical relation, so that in the operation of the machine coordinate arms of the two sets will engage with the same stalks and move them toward and onto the platform in a standing or vertical position.

The reel-arms curve in an opposite direction to their line of movement to enable them the better to free themselves from the stalks after the latter have been engaged by the reel-arms of the shock-forming mechanism. A wall E, approximately semicylindrical at its forward end $e$ and curving to the rear at $e'$, has slots $e^2$ in the semicylindrical portion $e$ for the free working of the reel-arms $d$ $d'$ therethrough. The rear portion of the wall is attached to vertical standards 4 and the front end portion terminates in tubular portions $e^3$, which are mounted upon the reel-shaft D'. Curved guides F act in opposition to the front portion of the wall E and provide a curved passage $f$, through which the stalks are moved by the reel on their way to the shock-forming mechanism. These guides F are attached to a vertical standard 5 and are braced at their forward ends by the vertical stay 6. The rear ends of the guides F are left free and are elastic to yield slightly, so as to prevent choking up of the inner end of the passage $f$. The front portions of the guides F are braced by blocks $f'$.

A turn or rotatable table G is provided and forms a greater part of the platform A and has a vertical rim $g$, which serves to retain the stalks within the limits of the table. A hub $g'$ is surmounted by an angular portion $g^2$ to make positive connection with the core H to cause the parts G and H to rotate in unison. Reel-arms $g^3$ extend from the hub and curve in the same direction as the reel-arms $d\ d'$, so as to gather the stalks and advance them to the center of the table. The core H has its lower end constructed to be removably fitted to the hub $g'$, so as to revolve therewith, and has a ring $h$ at its upper end to be connected to the hoisting-rope I when it is required to lift the shock. Braces J and J', pivotally attached at one end to the standards 4 and 5, respectively, have notches $j$ at their free ends to receive the spindle $h'$ at the upper end of the core and support the latter when in working position. A latch $j'$ is provided upon one of the braces, as J, and is notched to fit about the spindle $h$, the notches being so disposed as to provide a complete bearing for the spindle $h'$. A pin $j^2$ passes through the free end of the latch and the brace J' and holds the parts in firm relation when the core is in position.

The spreader comprises a runner K, outwardly-movable arms $k$, and a spreading device L for moving the free ends of the arms $k$ outward on operating the runner. The movable arms $k$ are pivoted at their upper ends to the runner and the lower ends are connected by shackles or chains $k'$, which serve to limit the spread of the arms and hold them in a fixed relation after being spread. The spreading device L is a conical flange or rim attached to the core, and which by engagement with the lower ends of the arms $k$ moves them outward on moving the core upward within the runner. Normally the runner occupies an elevated position, being supported by means of a spring-catch $l$, attached to the runner engaging with the upper end of the core. The runner has reel-arms $k^2$, which correspond in position and number with the reel-arms $g^3$, and act in conjunction therewith to gather in the stalks and maintain them in an upright position. The runner is held from turning upon the core by means of a pin $l'$, set in the core working in a slot $l^2$ in the runner.

Spring-compressors M, attached at one end to a standard 4, have the free ends working over the turn or shock-forming table G and acting in opposition to the reel-arms $g^3$ and $k^2$ to gradually form the shock and press the stalks about the core. Hooks $m$ are provided on the rear standard 4 to engage the compressors M and hold them when drawn back out of the way, so as to permit the depositing of the shock upon the ground. A retaining wire or band N is provided to sustain the shock in an upright position during the forming process. This band or wire is adapted to be wound upon a spring-actuated spool or drum $n$, and its free end is detachably connected to the front portion of the frame. This part N sustains the shock after it passes beyond the action of the spring-compressors.

Motion is imparted to the several parts in any convenient and desired manner. As shown, a shaft O is provided and driven from the wheel 3 by means of a sprocket-chain 7, passing around a sprocket-wheel 8, revolving with the drive-wheel 3, and a sprocket-pinion 9 on the shaft O. A bevel gear-wheel 10 at the inner end of the shaft O meshes with an idle bevel gear-wheel 11, which latter has a gear to mesh with the toothed rim $g$ of the table G, by means of which the latter is operated. A shaft P immediately in the rear of the cutting mechanism C has a bevel gear-wheel 12 at one end meshing with a bevel gear-wheel 20 on the end of a short shaft 21, having a bevel gear-wheel 22 at its opposite end to mesh with a bevel gear-wheel 23 on the lower end of the reel-shaft D'. This shaft P is set in motion from the shaft O by a sprocket-chain 13, passing over suitable sprocket gear-wheels on the respective shafts O and P. A shaft Q has a crank at its front end to which the pitman 14 for operating the cutting apparatus is attached, and its rear end has a bevel gear-wheel 15 to mesh with a corresponding bevel gear-wheel 16 on the end of the shaft O.

The crane S is adapted to swing laterally to deposit the shock upon the ground. The hoisting-rope I is wound upon the windlass T.

As the machine is drawn over the field the several parts are set in motion in the manner herein specified. The stalks entering the passage between the guards B are severed by the cutting apparatus C and are moved by the reel-arms $d\ d'$ through the passage $f$ upon the shock-forming table G. The reel-arms $g^3$ and $k^2$ take up the stalks and carry them around against the pressure of the compressors M and the band or wire N, by means of which the stalks are caused to advance toward the center or core and are packed around the same. After the shock is formed the compressors M are drawn back and engaged with the hooks $m$, the braces J and J' are disengaged from the core and turned out of the way, and the hoisting-rope is engaged with the core H. The catch $l$ is released and the rope I wound upon the windlass T. The core is drawn up within the runner, and the arms $k$ spread until the limit is reached, when the core, the runner, and the shock will move upward together. When the core is sufficiently elevated to clear the hub $g'$, the crane is turned to swing the shock clear of the machine, so as to deposit the shock upon the ground, which is effected by slacking the hoisting-rope I. After the shock settles the core will drop in the runner and permit the spreader-arms to contract. The catch automatically engaging with the core will hold the core and the runner together. Now by drawing upon the hoisting-rope the core will be disengaged from the shock by passing up and out through the upper end. It will be understood that the shock will be temporarily bound to the core before undertaking to lift the shock from the table; also that the shock will be permanently bound after it is deposited upon the ground, and, further, that the machine will be halted when it is required to deposit the shock.

Changes in the form, proportion, and the minor details of construction may be resorted to without departing from the principle or sacrificing any of the advantages of this invention.

The runner K is composed of two parts 24 and 25, which telescope, and which are held in the required position by means of a binding-screw 26 passing through the part 24 and bearing against the part 25. By this means the core can be lengthened and shortened to adapt it to the height of the grain to be formed into a shock.

It will be understood that in adapting and providing machines for the market they will be provided with any of the well-known means for throwing the mechanism in and out of gear at will and for raising and lowering the platform, whereby the cut may be effected at any desired distance from the surface of the ground. These parts, being common in this class of machinery, are dispensed with in the drawings for the sake of clearness in the illustrations.

Having thus described the invention, what is claimed as new, and desired to be secured by Letters Patent, is—

1. In a corn-harvesting machine, the combination with a shock-forming table having a central core, of a retaining device adapted to sustain the stalks against the core and yield as the shock is formed, the same consisting of a band and a spring-actuated drum, substantially as specified.

2. In a corn-harvesting machine, the combination with a shock-forming table, of spring-compressors, and a stalk-retaining device adapted to yield to the increasing size of the shock during its formation, the same consisting of a band and a spring-actuated drum, the band having its free end detachably connected with the frame of the machine, substantially as and for the purpose set forth.

3. The combination with a shock-forming table, of a core, a spreader at the lower end of the core, and means for expanding the spreader to increase the base of the shock, substantially as and for the purpose set forth.

4. The combination with a shock-forming table, of a core detachably connected therewith, a spreader at the lower end of the core, and means for expanding the spreader to increase the base of the shock and retain the latter in positive engagement with the core when lifting the latter, substantially as and for the purpose set forth.

5. The combination with a shock-forming table, of a core detachably connected therewith, arms grouped about the lower end of the core and having pivotal connection therewith at their upper ends, a conical spreader mounted upon the lower end of the core, and a runner operatively connected with the spreader to move the latter upward and expand the pivoted arms to increase the base of the shock and form positive means of attachment between the shock and the core, substantially in the manner set forth for the purpose described.

6. The combination with a shock-forming table, of a core detachably connected therewith, arms grouped about the lower end of the core and having pivotal connection therewith at their upper ends, flexible connections uniting the free ends of the pivoted arms, and a spreading device for expanding the free ends of the pivoted arms and their connections, whereby the base of the shock is increased and the said shock is supported upon the core, substantially as specified.

7. In a corn-harvester, the combination of a shock-forming table, a core detachably connected therewith at its lower end and having a spindle at its upper end, oppositely-disposed pivoted braces having notches at their free ends to be fitted to the spindle of the core, and a latch to secure the free ends of the pivoted braces together and about the said spindle, substantially in the manner set forth for the purpose described.

In testimony that I claim the foregoing as my own I have hereto affixed my signature in the presence of two witnesses.

JOSEPH M. SHIVELY.

Witnesses:
J. M. SPENCER,
EULA C. LYON.